Patented July 16, 1940

2,207,712

UNITED STATES PATENT OFFICE 2,207,712

PROCESS FOR SEPARATING FAT OR OIL SOLUBLE VITAMINS FROM FISH AND VEGETABLE OILS

James G. Blaso, East Elmhurst, N. Y., assignor, by direct and mesne assignments, to Natural Vitamins Corporation, a corporation of New Jersey No Drawing. Application July 17, 1937, Serial No. 154,190

8 Claims. (Cl. 167—81)

The present invention relates to a process of recovering and concentrating oil and fat soluble vitamins, and it particularly relates to a method of concentrating them in unsaturated fish and vegetable oils and to the novel concentrates obtained thereby.

Oil and fat soluble vitamins usually occur in substantial quantities in certain fish and vegetable oils, but it has not been readily possible to obtain or recover these vitamins from these oils without substantial expense and difficulty and without a decreased yield.

For example, in extracting these oil or fat soluble vitamins from oils (primarily vitamins A, D and E, also respectively termed the antixerophthalmic vitamin, the anti-raditic vitamin, and the anti-sterility vitamin), it has been found possible to saponify the glycerol fatty acid esters constituting a major fraction of the oil, then to convert the soaps thus formed into calcium salts, followed by extraction of the unsaponifiable material containing the vitamins with an organic solvent, such as alcohol, ether, ethylene dichloride and so forth.

The vitamins thus recovered are not of particularly high quality and after the removal of the solvent the vitamin concentrate or fraction which remains, frequently has a relatively unpleasant and unpalatable odor and taste and is quite expensive per unit.

As a result, it is not readily possible to administer the resultant vitamin product to human beings without undesirable effects or without enclosing the vitamin material in capsules or combining such vitamins with other materials which will conceal the taste and flavor.

It is among the objects of the present invention to provide an improved process of concentrating and recovering vitamins from oils containing the same in which the vitamins will be obtained in high yield at low expense and in a quality which may be directly readily ingested or taken by the human being.

Another object is to provide an enhanced vitamin product in which the oil soluble vitamins will be retained in their original environment and in relatively high concentration without the inclusion or simultaneous production of unpleasant or unpalatable tastes or odors.

Other objects will be obvious or will be apparent during the course of the following specification:

It has now been found that oil soluble vitamins and particularly vitamins A, D and E may be most effectively concentrated and recovered from oils, particularly unsaturated fish and vegetable oils containing the same, by hydrogenating such oils to substantially but not completely saturate them. By such hydrogenation process the fluidity of the oils is so decreased that the vitamin materials may be readily expressed or otherwise removed therefrom without the necessity of extracting with organic solvents or by chemical means and solely by the use of mechanical extraction or expression procedures.

It has been found, when this process is carried out in the presence of a relatively inert atmosphere, whether it be hydrogen, nitrogen, or carbon dioxide the vitamins as contained in the residual oil medium not only are particularly high in vitamin, but that the vitamin is of beneficial nature and is altogether devoid of by-products or allied compounds which often occur in conjunction with the vitamins and have undesirable or harmful effects.

The vitamin material so obtained appears to be particularly efficacious for administration to human beings, either as such or in the form of capsules or in mixtures under all circumstances where oil soluble vitamins, such as A, D or E should be administered. In addition, the concentrate is of such high value and quality that it may even be utilized to strengthen or fortify other vitamin compositions or food products which are deficient in vitamin content or have lost such vitamin due to improper packing, storage or shipment.

In hydrogenating the fish or vegetable oils containing the oil soluble vitamins, it is found most desirable to select an oil having an iodine value between 100 and 250 or more preferably between 150 and 200. This oil is then subjected to hydrogen with circulation and/or agitation at a pressure which may range from 50 to 300 lbs. per square inch, but which is preferably between 100 and 250 lbs. per square inch. The temperature should be substantially below 100° C. or 212° F. and generally should be substantially above room temperature, with the preferred range of temperatures being from 75 to 95° C. Because of the tendency of the vitamin materials to deteriorate and lose their effectiveness at elevated temperatures, however, it is generally desired to use a temperature of about and not exceeding 80 to 85° C.

In view of the fact that the hydrogenation is most preferably carried out in the presence of a nickel or other metal catalysts, preferably in combination with a carrier, such as a kieselguhr, or fuller's earth, it is generally desirable to filter the hydrogenated or partly solidified oil, the temperature of which may be elevated to make it flow readily through filter cloth. This filtration process should remove all of catalysts and the filtration desirably should be carried in an inert non-oxidizing atmosphere, preferably of carbon dioxide.

After filtration, the hydrogenated material may be extracted or expressed by mechanical means, for example, as by use of a centrifuge or a press.

The material is in most satisfactory condition for expression or extraction when it contains between 5 to 30% of the original oil in liquid form and has decreased between 50 to 200 units in its iodine value.

The preferred hydrogenated mixture for expression purposes is one having an iodine number of between 25 and 100 with a preferred range of 45 to 70.

In the extraction of the residual oil, the material from the filter press, after separation of the catalyst, may be first stored, or may be enclosed directly in filter cloth or in a cloth bag. The hydrogenated material may be cooled to a temperature of approximating room temperature or to a temperature varying from 20 to 45° C. after the hydrogenated material has been permitted to stand sufficiently to solidify and until the high melting point hydrogenated compounds have been crystallized or balled. This expression preferably takes place in the presence of a carbon dioxide atmosphere and desirably the pressure is only gradually increased after the liquid portion begins to run and to separate from the mass of the hydrogenated material.

Although various methods of pressing may be employed, it is generally found desirable to enclose the hydrogenated material in cloths or bags and to press it between rollers or in a hydraulic press.

The oil concentrate may be used directly or it may be treated to remove any foots. In this latter case the oil concentrate is permitted to settle in a tank and preferably in a tank with a conical bottom and after settling for a sufficient period, the foots are removed and the clear vitamin containing concentrate is removed from the upper portion of the tank.

Among the many types of oils which may be employed as raw materials, either separately or in combination, are fish, fish liver and vegetable oils. Among the oils which may be utilized are fish oils, such as eel, herring and salmon oils; fish liver oils, such as albacore, burbot, cod, halibut, herring, ling, plaice, pollack, salmon, puffer, shark, skate, stereolepis, ishinagi, raja calvata and sea-gull; and vegetable oils, such as hempseed, lettuce seed, maize, oat, polin and wheat germ oil.

These oils are preferably hydrogenated in a closed vessel or converter with or without cycling at a temperature of about 180° F. and at a pressure of between 200 and 250 lbs. per square inch.

The catalyst used may either be a nickel catalyst supported on kieselguhr or a nickel-aluminum catalyst supported on fuller's earth.

The hydrogenation may be continued until the iodine value has been reduced, say from 155 to 185 down to 35 to 55 or until there remains about 10 to 30% of the original oily materials, as may be determined by a refractometer.

If the hydrogenation is continued beyond this point, the vitamins may be disadvantageously effected and it is often quite difficult to separate them from the residual hydrogenated mass.

The incompletely hydrogenated or hardened oil preferably still at the elevated temperature of about 180° F. is then pumped from the convertor into a filter press, the trough of which is enclosed by a compartment filled with carbon dioxide. It is most desirable to prevent the warm hydrogenated oil from coming into direct contact with the atmosphere which might oxidize or otherwise disadvantageously affect the vitamins.

After the filtration, the oil should be clear and then may be flowed into a reservoir or storage tank having steam and/or refrigerating coils and a light fitting cover for the gas release valve.

The interior of this tank is preferably filled with carbon dioxide gas and when the tank receives oil being filtered the gas release valve is preferably slightly opened and connected to a discharge pipe attachment to a compressor for the filter press so that the displaced carbon dioxide may be recovered. The incompletely hardened oil may be stored for some time in the presence of the inert gas until ready for expressing the liquid portion.

If the material has been hardened for some time, it may be heated by the steam coils until it is sufficiently softened and is capable of being passed into a cloth sack or into some other receptacle in which the residual liquid may be expressed or extracted.

If desired the material enclosed in the cloth sack or wrapped in cloths may be cooled to a temperature of about 20 to 30° in a chamber filled with carbon dioxide or nitrogen. This temperature may be maintained for several hours to induce crystallization or balling of the high melting point hydrogenated compounds.

After cooling for one to several hours, the sack or material may be subjected to gradual increasing pressure by a hydraulic press or by the rollers to cause the liquid portion containing the vitamins to be exuded or removed.

If desired the press-cake or the residual material left after one expression may be further expressed at a higher temperature to obtain increased yields of the vitamins, such higher temperature, for example, varying from 25 to 40° C. The temperature of expression or extraction may generally depend upon the amount of hydrogenation and the particular types of oils which have been hydrogenated. In any case the liquid vitamin concentrate may be filled into dark amber colored bottles and a piece of solid carbon dioxide may be placed in the gas space in the bottles to remove all atmospheric oxygen after which the container may be tightly stoppered.

In connection with vegetable oils, such as those mentioned above derived from seeds, it is often desirable to let the oil separate for the purpose of removing the foots, this being most desirably accomplished by a conical tank which will permit the foots to be removed from the bottom and the surface oil which contains the vitamins to be readily separated.

The vitamin materials which may be obtained in this concentrate appear to be of particularly high quality and are altogether devoid of saturated undigestable fatty acid glycerides.

The product has substantially no odor or unpleasant taste. The liquid concentrate is absolutely clear, and does not decompose if stored in dark vessels containing an inert gas, and may be used to increase the vitamin content of other vitamin deficient oils which are below the U. S. P. standards or may be added directly to animal feeds as well as other food products capable of an oil or fat admixture.

Although fish, fish liver and vegetable oils are stated as preferred oils. the process is also adapted to the recovery of vitamin materials from other types of oils and the present process is also designed for the recovery of other soluble non-hydrogenatable materials from unsaturated oil mixtures containing the same.

Although the method of expression or extraction by mechanical means is preferred, it is possible to separate the vitamins by fractional crystallization or by solvents or even by partial saponification processes, all of which procedures may be utilized to separate the vitamins from the residual oil fraction.

It is also possible to further hydrogenate the residual oil fraction to increase the concentration of the vitamins which by repeated processing may be obtained in highly pure condition, but generally this is too expensive for commercial purposes.

May other changes could be effected in the particular features of process treatment disclosed, and in specific details thereof, without substantially departing from the invention intended to be defined in the claims, the specific description herein merely serving to illustrate certain elements by which, in one embodiment, the spirit of the invention may be effectuated.

What is claimed is:

1. The process of recovering oil soluble vitamins from oils containing the same having an iodine number ranging from between 100 and 250, which comprises hydrogenating the oils at a pressure between about 50 to 300 lbs. per square inch and at a temperature between about 75 and 95° C., solidifying or hardening the hydrogenated oil and then removing the residual liquid portions thereof, said liquid portions containing the vitamins contained in the original oils and constituting a minor portion of the original oils.

2. The process of recovering oil soluble vitamins from oils containing the same having an iodine number ranging from between about 155 and 185, which comprises hydrogenating the oils until a major portion thereof becomes saturated at a pressure between about 200 and 250 lbs. per square inch and at a temperature between about 80 and 85° C. and then separating the unhydrogenated liquid portion, said liquid portion constituting a minor part of the original oils and containing the oil soluble vitamins of the original oils.

3. A process of recovering oil soluble vitamins from oils containing the same having an iodine number ranging from between 100 and 250, which comprises hydrogenating the oils in the presence of a metal catalyst at a pressure between about 50 to 300 lbs. per square inch and at a temperature between about 75 and 95° C., filtering, cooling to solidify saturated portions of the oils, removing such solidified portions and thus obtaining residual liquid portions which contain the vitamins of the original oils.

4. A process of recovering oil soluble vitamins from oils containing the same, which comprises hydrogenating the oils at a temperature between 75 to 95° C. and at a pressure of 50 to 250 lbs. per square inch until a major portion of the unsaturated components have been hydrogenated and then recovering the vitamins in the residual liquid oil fraction by cooling to cause solidification of the hydrogenated components of the oils, followed by expression to remove the residual liquid oil fraction.

5. A process of recovering oil soluble vitamins from oils containing the same, which comprises hydrogenating the oils at a temperature of about 180° F. and at a hydrogen pressure of about 100 lbs. per square inch in the presence of a nickel catalyst until the iodine value has been reduced from above 150 to below 100, filtering the oil to remove the catalyst while maintaining an inert atmosphere and while maintaining the oil in liquid condition, cooling the filtered oil to a temperature of between 15 to 35° C., enclosing the hydrogenated material in a cloth, and expressing the material to remove the liquid fraction therefrom, said vitamins being contained in said liquid fraction.

6. A process of hydrogenating fish, fish liver and vegetable oils and recovering the oil soluble vitamins therefrom which comprises treating them with hydrogen at a pressure of about 100 lbs. per square inch and at a temperature of about 180° F. until the major portion of the oil has been hydrogenated, cooling to solidify the hydrogenated portion of the oil and then expressing the vitamin containing residual oil fraction, said residue constituting a minor fraction of the original oils and containing the oil soluble vitamins of said original oils.

7. The process of recovering oil soluble vitamins from oils containing the same having an iodine number ranging from between about 100 and 250, which comprises hydrogenating the oils at a pressure between about 50 to 300 lbs. per square inch and at a temperature between about 75 and 95° C. solidifying or hardening the hydrogenated oil and then removing the residual liquid portions thereof in the presence of an inert gas, said residue constituting a minor fraction of the original oils and containing the oil soluble vitamins of said original oils.

8. A process of recovering oil soluble vitamins from oils containing the same, which comprises hydrogenating the oils at a temperature between 75 to 95° C. and at a pressure of 50 to 250 lbs. per square inch until a major portion of the unsaturated components have been hydrogenated and then recovering the vitamins in the residual liquid oil fraction in the presence of an inert gas by chilling to solidify the hydrogenated components, followed by expression to remove the residual liquid oil fraction.

JAMES G. BLASO.